United States Patent [19]

Suquet

[11] Patent Number: 4,902,970
[45] Date of Patent: Feb. 20, 1990

[54] APPARATUS FOR MEASURING THE SPEED OF AN OBJECT WITH CIRCUIT FOR CONVERTING ANALOG SIGNALS INTO LOGIC SIGNALS AND CIRCUIT FOR VARYING SENSITIVITY

[75] Inventor: Michel Suquet, Cugnaux, France

[73] Assignee: Bendix Electronics S.A., Toulouse, France

[21] Appl. No.: 157,203

[22] Filed: Feb. 17, 1988

[30] Foreign Application Priority Data

Mar. 20, 1987 [FR] France .................. 87 03876

[51] Int. Cl.$^4$ .................. G01P 3/48; G01P 3/54; H03K 5/00; H03B 19/00
[52] U.S. Cl. .................. 324/173; 324/166; 324/207.25; 341/155; 307/261; 328/13
[58] Field of Search ............ 324/202, 207, 208, 166, 324/173, 174; 341/32, 155, 158, 162, 164; 307/261, 355, 362; 328/13, 28, 31

[56] References Cited

U.S. PATENT DOCUMENTS 3,763,436 10/1973 Haw .
3,801,830 4/1974 Boyer .
3,882,474 5/1975 Cain .
4,001,604 1/1977 Parks et al. .
4,074,325 2/1978 Sakai et al. .
4,575,664 3/1986 Johnson .

FOREIGN PATENT DOCUMENTS 2556257 6/1977 Fed. Rep. of Germany .

Primary Examiner—Gerard R. Strecker
Assistant Examiner—Walter E. Snow
Attorney, Agent, or Firm—Russel C. Wells; George L. Boller

[57] ABSTRACT

The circuit comprises a comparator 1 fed by a quasi-sinusoidal signal delivered by a source 2 for converting the positive alternations of the signal into pulses acceptable by digital computing means. According to the invention, the circuit comprises a current source 7 selectively connectible to the circuit in order to vary its sensitivity and to thus enable an evaluation of the amplitude of the signal delivered by the source 2. Application to the diagnosis of the operating state of a variable reluctance sensor delivering a quasi-sinusoidal signal representing the speed of rotation of a shaft fitted in a motor vehicle.

12 Claims, 2 Drawing Sheets

APPARATUS FOR MEASURING THE SPEED OF AN OBJECT WITH CIRCUIT FOR CONVERTING ANALOG SIGNALS INTO LOGIC SIGNALS AND CIRCUIT FOR VARYING SENSITIVITY

The present invention relates to a circuit for converting analog signals into logic signals and, more particularly, to such a circuit equipped with means of evaluation of the level of the analog signal supplied to the circuit.

For the conversion of an alternating periodic signal into a logic signal constituted, for example, for electrical voltage pulses of predetermined level, there is currently used a comparator whose output exhibits one or other of two logic states depending on the sign of the potential difference applied across the inputs of the comparator, this potential difference being linked with the variations in the periodic signal to be converted. In this way it is possible to convert the alternations of the periodic signal into pulses which can be accepted by digital circuits, for counting requirements for example.

This is particularly the case when the periodic signal is constituted by the output signal of a variable reluctance sensor associated with a toothed disk rotating with a shaft, this output signal having the appearance of a sinusoidal signal whose frequency indicates the speed of rotation of the shaft. In order to transmit this speed to digital means performing computations based on this speed, there is formed a series of pulses associated with alternations of the signal, the counting of these pulses by the digital means enabling the speed of the shaft to be obtained.

The amplitude of the quasi-sinusoidal signal supplied by a variable reluctance sensor is a function of the speed of rotation of the shaft and also of the airgap width, i.e. of the distance which separates the teeth of the disk and the sensor, a distance which is set by a mechanical adjustment. When this distance increases, the amplitude of the signal decreases, at constant velocity. This decrease can make this signal unusable. Now, in certain difficult environments such as that of the engine of a motor vehicle, vibrations can modify the adjustment of this distance by loosening the means of fixing the sensor for example. It is therefore appropriate to be able to periodically check that the airgap width is not such that it prevents the supply of a signal which can be used by the sensor. Checking by conventional mechanical measuring means such as gauges, spacing blocks, etc. is not practicable in the application mentioned above because of the difficulty of access to the sensor and of the periodic nature of this checking, which makes it costly.

In addition, the attenuation of the signal from the sensor can also result from a partial short-circuit of its electrical winding. It is appropriate that the consequences of such damage can be detected by a periodic check of the amplitude of the signal supplied by the sensor.

It is therefore an object of the present invention to enable such checking by purely electronic means capable of being automatically implemented by digital computing means making use of the velocity information contained in the output signal of the sensor.

This object of the invention is achieved with a circuit for converting an alternating analog electrical signal into a logic signal, comprising a comparator having first and second inputs between which the analog signal is applied differentially, a DC bias voltage source connected by one terminal to these first and second inputs through first and second resistors respectively and means of causing the sensitivity of the circuit to vary selectively, characterized in that these means comprise a current source selectively connectable between the first input of the comparator and the other terminal of the voltage source, and a switching device for controlling the bringing into circuit of the current source and thus triggering the appearance of a predetermined offset voltage at the terminals of the first resistor, in order to determine the amplitude of the voltage of the analog signal which triggers the production of logic pulses at the output of the comparator.

In the accompanying drawing, given by way of example only:

Figure 1:
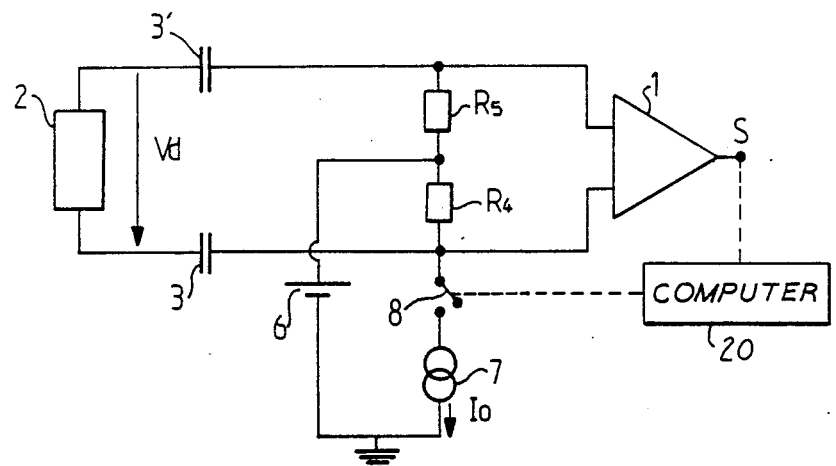
FIG. 1 is a circuit diagram of the convertor circuit according to the invention.
Figure 2A:
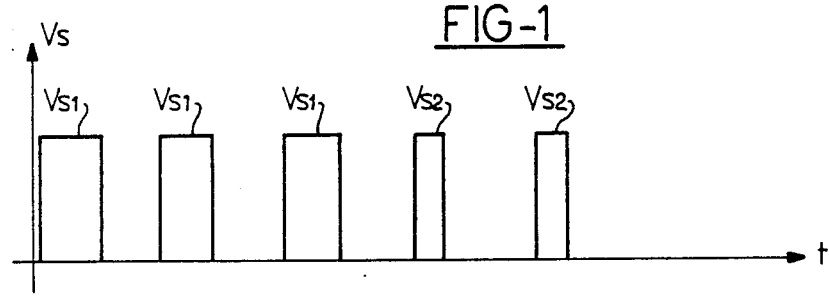
FIGS. 2a and 2b show graphs useful for understanding the operation of the converter according to the invention.

Reference is made to FIGS. 1 and 2 where it can be seen that the converter circuit of FIG. 1 essentially comprises a comparator 1 having a first inverting input ($-$) and a second non-inverting input ($+$). A source 2 supplies an analog signal applied differentially between the inputs of the comparator by means of capacitors 3 and 3'. In a particular embodiment of the circuit according to the invention, the source 2 is constituted by a variable reluctance magnetic sensor 2a of the type used in a motor vehicle for detecting the speed of rotation of a wheel or of the engine output shaft. This sensor is then associated with a toothed disk 2b rotating with the spindle of the wheel or with the engine shaft 2c, the sensor being fixed in the vicinity of the trajectory of the teeth of the disk. The passage of the teeth in front of the sensor causes the reluctance of its magnetic circuit to vary because of the variation in the width of the disk-sensor airgap due to the cutting of the teeth of the disk. This reluctance variation induces in an electrical winding of the sensor a quasi-sinusoidal signal whose frequency is equal to that of the passage of the teeth in front of the sensor. This frequency is obviously linked with the speed of rotation of the shaft, which can thus be derived.

The quasi-sinusoidal signal supplied by the sensor is not suitable for use by digital computing means such as those which are used in automatic gearbox controllers or in anti-locking devices for wheels. It is therefore appropriate to convert this analog signal into a logic signal enabling the frequency of the signal to be derived by a simple counting of suitably shaped electrical pulses. In order to do this the comparator 1 produces at its output S, in a conventional way, rectangular electrical voltage pulses $V_s$ of determined amplitude (see FIG. 2a) which are synchronous with the positive alternations of the quasi-sinusoidal signal transmitted by the capacitors 3, 3' to the inputs of the comparator, from the voltage signal $V_d$ formed by the sensor 2 (see FIG. 2b).

In order to obtain the rectangular pulses $V_s$, it suffices that the signal $V_d$ should pass through the levels ($+e$) and ($-e$) which correspond to the switch-overs of the output of the comparator 1, in the case in which this comparator exhibits histeresis. The rectangular pulses $V_{s1}$ of FIG. 2a correspond to alternations of the analog signal $V_d$ whose amplitude greatly exceeds the levels (+e) and (−e). The switchings of the comparator 1 are therefore sharp.

For the reasons described above, according to the invention it is desired to check that the amplitude of the signal supplied by the sensor 2 is such that it corresponds to a correct airgap and/or to a winding without any partial short-circuit, in order to be assured of the validity of the velocity data supplied by the sensor on the one hand, and in order to check the operational state of the sensor in order to possibly carry out a preventive maintenance before the appearance of a complete failure on the other hand.

According to the present invention, the converter circuit is equipped for this purpose with means of causing the sensitivity of the circuit to vary selectively. First and second resistors $R_4$ and $R_5$ respectively, of the same value R, are installed in series between the inputs of the comparator 1, a DC bias voltage source 6 being connected between the common point of the resistors $R_4$ and $R_5$ and ground. The means of adjusting the sensitivity of the circuit comprise a current source 7 and a switching device 8 connected in series with one of the resistors $R_4$, $R_5$, between the terminals of the voltage source 6. In the circuit of FIG. 1, it is the resistor $R_4$ connected to the inverting input of the comparator which is placed in series with the current source 7, by means of the switching device 8. Now, when this device is closed, the source 7 causes a current $I_o$ to flow in the resistor $R_4$, which causes an offset voltage drop $RI_o$ to appear at the terminals of this resistor. This voltage drop lowers the potential applied to the inverting input of the comparator 1 by the same amount.

Figure 2B:
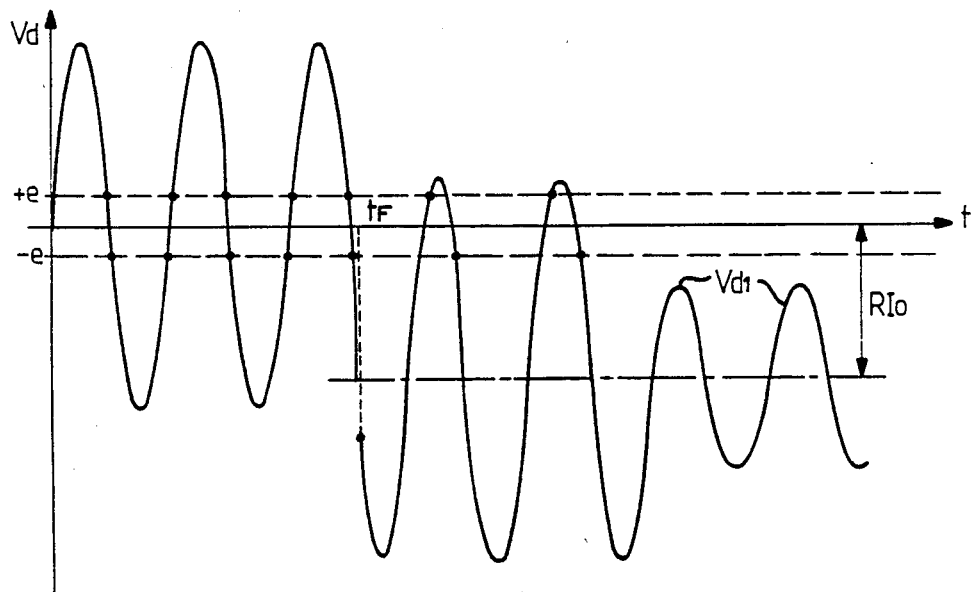

Referring now to the graph in FIG. 2b, it can be seen that this offset voltage $RI_o$ changes the position of the signal $V_d$ with respect to the switching thresholds (+e) and (−e) of the comparator 1. Thus, with the switching unit 8 being closed at the instant $t_F$ in order to place the current source 7 in circuit, it appears that the quasi-sinusoidal signal supplied by the sensor must exceed the values $RI_o$ +/−e in amplitude in order to pass through the switching thresholds of the sensor and thus cause the appearance of pulses $V_{s2}$ at the output of the comparator 1.

If, on the other hand, alternations $V_{d1}$ (FIG. 2b) of the signal $V_d$ do not reach these amplitude values, there will be no generation of pulses $V_s$. It is conceived therefore that it is possible to compare the real amplitude of the signal $V_d$ with the value $RI_o$ which can be adjusted to a predetermined level by adjusting the current $I_o$ in the resistor $R_4$.

According to the invention, the above circuit is applied to the carrying out of a diagnosis relating to the operating state of a variable reluctance sensor installed in a motor vehicle, for example, for supplying a quasi-sinusoidal signal having a frequency which is dependent on the speed of rotation of a wheel or of an engine shaft. As has been seen above, the amplitude of the signal supplied by such a sensor depends not only on the width of the sensor/toothed disk airgap but also on the speed of rotation of the disk and therefore of the monitored wheel or shaft. In order to diagnose the operating state of the sensor it is appropriate to eliminate the effect of the speed on the amplitude of the signal supplied. The checking must therefore be carried out at a predetermined speed. Otherwise a correction depending on the speed must be applied to the value $RI_o$ which constitutes the comparison reference for the amplitude of the signal $V_d$.

In order to carry out a diagnosis, the conduction of the switching device 8, constituted for example by a transistor controlled by its base, is triggered. The control signal of the device 8 can be supplied by the computing means 20 which make use of the signal formed by the sensor 2, such as an electronic gearbox controller or a computer of a wheel anti-locking device for example. The instant of the test can be determined by the means of computing themselves, in preparation of an action which takes account of the validity of the speed data delivered by the sensor. The means of computing initiate the test at a predetermined speed of the monitored moving object, or take account of its speed at the instant of the test.

The conduction of the device 8 places the current source in circuit thus causing the appearance of a voltage drop $RI_o$ at the terminals of the resistor $R_4$. As has been seen above, if the comparator continues to supply pulses to the means of computing, it is because the amplitude of the signal delivered by the sensor exceeds the thresholds $RI_o$ +/−e, an amplitude which is adjusted in order to correspond to a signal supplied by a sensor whose winding is not affected by a partial short-circuit or by an exceeding of the nominal airgap width.

In the opposite case, i.e. if the means 20 of computing detect that the output S of the comparator is no longer supplying pulses, the diagnosis is that the sensor is affected by an operating fault and that it is therefore necessary to carry out a preventive maintenance on that sensor. The amplitude of the signal supplied by the sensor can also be compared with several levels $RI_o$ by varying the value $I_o$, in order to thus carry out a true measurement of this amplitude. Several different reactions can be implemented as a function of the measured value, other than those mentioned above. If, for example, the level of the signal supplied by the sensor is considered too small to be distinguished from the noise affecting the signal, the means of computing can exclude the speed as measured by the defective sensor from computations in order to prevent an incorrect value of this speed from being taken into account in the computations. The anti-locking system or the gearbox controller can even be entirely switched out and replaced by a conventional control performed by the driver himself.

Figure 3:
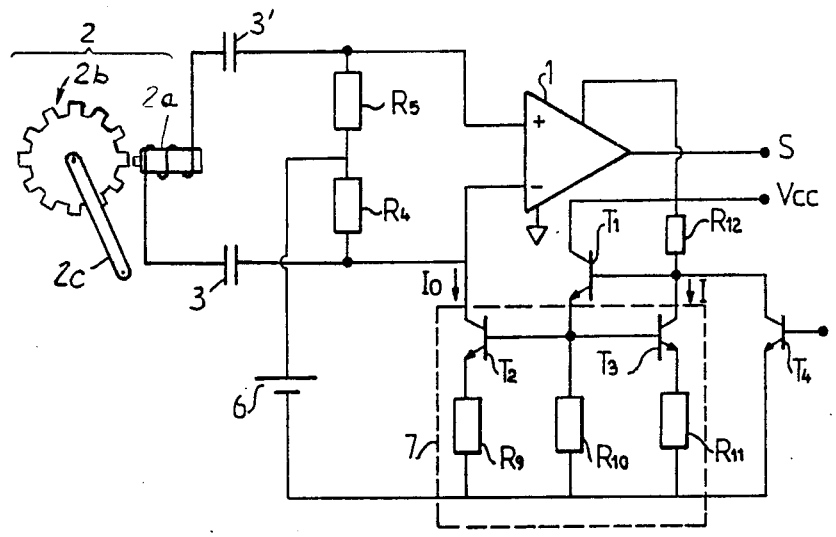
FIG. 3 shows a first embodiment of the converter of FIG. 1.

FIG. 3 shows a particular embodiment of the converter circuit according to the invention in which the current source 7 is produced by means of a group of transistors in current mirror configuration. In this figure, the same references as those in FIG. 1 have been used to designate similar components.

The current source 7 is constituted from two NPN transistors $T_2$ and $T_3$ connected as current mirrors, their common base being loaded by a resistor $R_{10}$, while resistors $R_9$ and $R_{11}$ load the emitters of the transistors $T_2$ and $T_3$ respectively. Identical transistors have been chosen for the transistors $T_2$ and $T_3$ and equal values have been chosen for the resistors $R_9$ and $R_{11}$. Under these conditions, the flow of a current I in the emitter-collector circuit of the transistor $T_3$ is reflected by the flow of a current $I_o$ of the same value in the emitter-collector circuit of the transistor $T_2$, this current $I_o$ establishing a voltage drop $RI_o$ in the resistor $R_4$.

It will be noted that the high input impedance of the source 7 prevents the latter from disturbing the signal supplied by the sensor when the source 7 is not delivering current. Also, the capacitive coupling of the sensor 2 to the inputs of the comparator 1 enables the isolation, according to the invention, of the sensor 2 from the DC current source 7, an isolation which prevents the short-circuiting of the voltage offset applied to the inputs of the comparator.

The common base of the transistors $T_2$ and $T_3$ is controlled by the emitter-collector circuit of an NPN transistor $T_1$ whose base is connected to the point common to a load resistor $R_{12}$ and the collector of the transistor $T_3$ and to the collector of an NPN transistor $T_4$ whose emitter is grounded. The collector of the transistor $T_1$ and the other terminal of the resistor $R_{12}$ are connected to a voltage power supply source $V_{cc}$.

The conduction of the transistors $T_2$ and $T_3$ is triggered by a diagnostic control signal applied to the base of transistor $T_4$ which itself controls the transistor $T_1$ by means of the base of the latter. Currents I and $I_O$ then flow in the emitter-collector circuits of the transistors $T_2$ and $T_3$ connected as current mirrors. The value of these currents is given by the following formula:

$$I_o = I = (V_{cc} - 2V_{be})/(R_{11} + R_{12}) \quad (1)$$

the term $2 V_{be}$ corresponding to the emitter-base voltage drops of the transistors $T_1$ and $T_3$.

The current $I_o$ thus creates the voltage drop $RI_o$ at the terminals of the resistor $R_4$ (a voltage drop which is used by the circuit according to the invention in order to carry out a diagnosis of the signal formed by the sensor 2 and, by means of this, of the functioning of the sensor, as a function of the production or of the non-production of output pulses $V_s$ by the comparator 1. The above formula (1) shows that the current $I_o$ which determines the voltage drop $RI_o$ can be subject to variations due to fluctuations in the supply voltage $V_{cc}$, common variations in a motor vehicle, or due to temperature variations which effect the value of the emitter-base voltage drop $V_{be}$ of the transistor $T_3$. It may be desired to improve the accuracy of the diagnosis by having a current source which is better protected from such variations than that used in the circuit of FIG. 3.

Figure 4:
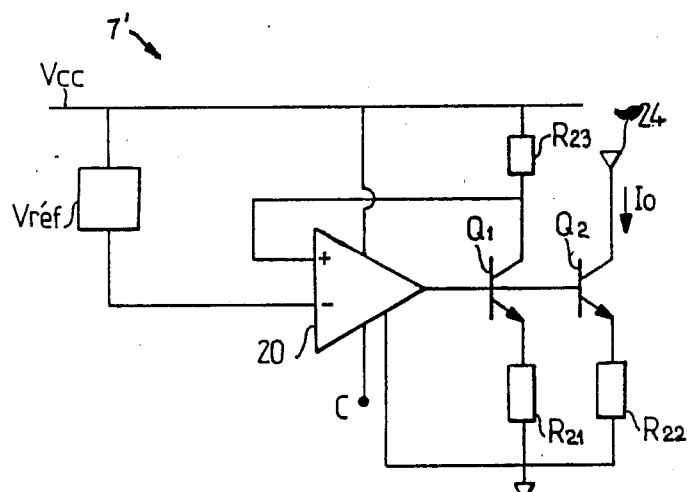
FIG. 4 shows a variant of the current source used in the circuit according to the invention which improves the stability of the circuit.

For this purpose, according to the invention, it is possible to use the current source 7' shown in FIG. 4 which is characterized by a better immunity with respect to variations in supply voltage $V_{cc}$ and temperature variations.

This current source 7' comprises a programmable operational amplifier 20 connected as a comparator, whose output controls the common base of the NPN transistors $Q_1$ and $Q_2$ (in current mirror configuration). Resistors $R_{21}$ and $R_{22}$ are connected between the emitters of transistors $Q_1$ and $Q_2$ respectively and ground. A resistor $R_{23}$ is connected between a power supply $V_{cc}$ and the collector of the transistor $Q_1$. The positive input of the operational amplifier is connected to the collector of the transistor $Q_1$ while its negative input is connected to a reference voltage source $V_{ref}$, which is itself connected to the supply source $V_{cc}$. The current source is connected to the converter circuit according to the invention by the collector-emitter circuit of the transistor $Q_2$, connected at 24 to the negative input of the comparator.

This current source 7' is connected to the converter circuit according to the invention by a signal applied to the control input C of the amplifier 20, an input which then acts as a switching device, when a diagnosis is requested. This results in the switching on of the transistors $Q_1$ and $Q_2$ and the flowing of the currents I and $I_1$ in the emitter-collector circuits of the transistors $Q_1$ and $Q_2$. According to the invention, identical transistors $Q_1$ and $Q_2$ and identical resistors $R_{21}$ and $R_{22}$ are chosen for this source. The emitter-base voltage drops $V_{be}$ in the two transistors are therefore identical and any variation in this voltage drop due to a variation in temperature is corrected by feedback from the point common to the resistor $R_{23}$ and to the collector of the transistor $Q_1$ to the positive input of the amplifier 20. Similarly any fluctuation in the supply voltage $V_{cc}$ is corrected by this same feedback. The accuracy of the current source in FIG. 4 is thus made much better than that of the current source 7 in FIG. 3 which can however suffice in applications where great precision is not required.

As mentioned above, the circuit according to the invention can be adapted to a true measurement of the amplitude of the signal delivered by the sensor, and not only to a simple comparison of the amplitude of this signal with a reference value. For this purpose the circuit of FIG. 4, for example, is modified such that the reference voltage generator $V_{ref}$ is adjustable to several separate voltage levels. This generator can take the form of a digital-analog converter controlled, for example, by the means of computing making use of the signal from the sensor. The amplitude A of this signal is obtained by carrying out several tests of successive levels and by identifying the value A of $V_{ref}$ such that the comparator supplies an output signal for $V_{ref} = A - \epsilon$ and does not supply a signal for $V_{ref} = A + \epsilon$, $\epsilon$ being the step between comparison levels which gives the measurement accuracy.

The comparator used in the circuit according to the invention can be constituted by an operational amplifier functioning in the saturated state. It may or may not exhibit hysteresis. It is preferred however to use a hysteresis comparator (see FIG. 2) in order to eliminate certain noises affecting the output signal of the sensor.

Thus, the converter circuit according to the invention is equipped with means enabling the sensitivity of the circuit to be varied for diagnostic requirements on the amplitude of a quasi-sinusoidal signal. This amplitude can be compared with a predetermined threshold or with a series of levels if a true measurement of the amplitude of the signal is required. The invention applies to the conversion of an analog signal into a logic signal and, more particularly, to the processing of the signal delivered by a variable reluctance magnetic speed sensor, without this application being limiting. In fact the invention extends to the carrying out of diagnostics or measurements of the amplitude of any periodic analog signal processed by a circuit for converting this signal into logic signals, by controlled modification of the sensitivity of the circuit.

I claim:

1. A circuit for converting an analog electrical signal into a pulsed logic signal, comprising:
   a source for generating the analog signal,
   a comparator having first and second inputs between which the analog signal is applied,
   a DC bias voltage source connected by one terminal to said first and second inputs through first and second resistors respectively and
   means for selectively varying the input voltage sensitivity of the circuit,
   said means comprising:
   a current source (7),
   a switching device (8) for selectively connecting said current source between said first input of said comparator and the other terminal of said voltage source, said current source providing a predetermined offset voltage at the terminals of said first resistor ($R_4$), for selecting the voltage amplitude of the analog signal for generating pulsed logic signals at the output of said comparator.

2. The circuit according to claim 1, additionally including capacitive means interposed said two inputs of said comparator and a corresponding terminal of said source (2) delivering the analog signal.

3. The circuit of claim 1, characterized in that said current source (7) comprises first and second transistors ($T_2$, $T_3$) connected as current mirrors, the collector-emitter circuit of one ($T_2$) of said transistors being connected between the first input of said comparator and ground, a third transistor ($T_1$) connected to the common base of said first and second transistors, said switching device controlling said third transistor for determining the flow of a current ($I_o$) in the collector-emitter circuit of said first transistor ($T_2$) for establishing an offset voltage at the terminals of said first resistor ($R_4$).

4. The circuit of claim 1, characterized in that said current source (7) comprises an operational amplifier (20) having an output signal controlling third and fourth transistors ($Q_1$, $Q_2$) connected as current mirrors, the collector-emitter circuit of one ($Q_2$) of said transistors being connected between the first input of said comparator and ground and the current ($I_o$) flowing in said current source establishing an offset voltage drop at the terminals of said first resistor ($R_4$), one input of said operational amplifier being connected to a reference voltage source ($V_{ref}$), the other input being connected to the collector of said other transistor ($Q_1$) for compensating for the effects of any variation in the supply voltage or the temperature of the circuit on said output signal of said operational amplifier.

5. The circuit according to claim 4, characterized in that said operational amplifier (20) is programmable and said switching device comprises a control input (C) of said operational amplifier.

6. The circuit according to claims 4 or 5, wherein said adjustable reference voltage source ($V_{ref}$) controls the sensitivity of the circuit at several different levels over a range of such levels and in response to two successive levels the circuits derives a measurement of the amplitude of the analog signal from the production and from the non-production respectively of the pulsed logic signals at the output of said comparator.

7. The circuit according to claim 6, characterized in that said adjustable reference voltage source is a digital-analog converter.

8. The circuit according to claim 6, wherein said source is a variable reluctance magnetic sensor for generating the analog voltage signal in response to the speed of a moving object, said adjustable reference voltage source varying the sensitivity of the circuit for controlling the production or non-production of pulsed logic signals at the output of said comparator, and fault means responsive to said adjustable reference voltage source for indicating the minimum acceptable amplitude of the analog signal from said sensor.

9. The circuit according to claim 8, wherein said moving object is moving at a predetermined speed.

10. The circuit according to claim 8, wherein said means of varying the sensitivity of the circuit is responsive to the instantaneous speed of said moving object.

11. The circuit according to claim 8, additionally including means for comparing the amplitude of the analog signal with several successive levels of offset voltage for setting up a similar number of separate sensitivity levels of the circuit.

12. The circuit according to claim 8 wherein the signal delivered by said sensor represents the speed of rotation of a shaft forming part of a motor vehicle.

* * * * *